(12) United States Patent
Holliday et al.

(10) Patent No.: US 10,886,726 B2
(45) Date of Patent: Jan. 5, 2021

(54) CONTROL METHOD FOR PROTECTING TRANSFORMERS

(71) Applicant: General Electric Company, Schenectady, NY (US)

(72) Inventors: Cornelius Edward Holliday, Forest, VA (US); Devendra S. Dange, Columbia, SC (US); Lahlali Benchaita, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 308 days.

(21) Appl. No.: 15/705,411

(22) Filed: Sep. 15, 2017

(65) Prior Publication Data

US 2019/0089145 A1 Mar. 21, 2019

(51) Int. Cl.
| | |
|---|---|
| *H02H 7/04* | (2006.01) |
| *H01F 38/14* | (2006.01) |
| *H02M 5/42* | (2006.01) |
| *H02P 9/00* | (2006.01) |
| *H02H 1/00* | (2006.01) |

(Continued)

(52) U.S. Cl.
CPC ............... *H02H 7/04* (2013.01); *F03D 9/255* (2017.02); *G05F 1/10* (2013.01); *H01F 38/14* (2013.01); *H02H 1/0007* (2013.01); *H02H 9/02* (2013.01); *H02J 3/1878* (2013.01); *H02K 7/183* (2013.01); *H02M 5/42* (2013.01); *H02P 9/007* (2013.01);
(Continued)

(58) Field of Classification Search
CPC .......... H02H 7/04; H02H 1/0007; H02H 9/02; F03D 9/255; H01F 38/14; H02K 7/183; H02M 5/42; H02P 9/007
See application file for complete search history.

(56) References Cited

U.S. PATENT DOCUMENTS

| | | | | |
|---|---|---|---|---|
| 3,183,423 A | * | 5/1965 | Manners | ................. B66C 13/26 |
| | | | | 318/741 |
| 6,522,517 B1 | * | 2/2003 | Edel | ...................... G01R 15/185 |
| | | | | 361/143 |

(Continued)

FOREIGN PATENT DOCUMENTS

| | | |
|---|---|---|
| DE | 202015101806 U1 | 4/2015 |
| JP | H11252908 A | 9/1999 |
| WO | WO2012/104580 A2 | 8/2012 |

OTHER PUBLICATIONS

U.S. Appl. No. 15/608,073, filed May 30, 2017.
European Search Report, dated Feb. 12, 2019.

*Primary Examiner* — Pete T Lee
(74) *Attorney, Agent, or Firm* — Dority & Manning, P.A.

(57) ABSTRACT

A method for controlling a transformer includes specifying, in one or more control devices, an initial operating limit (e.g. an initial current limit or an initial temperature limit) for one or more windings of the transformer. Further, the method includes monitoring, via one or more sensors, at least one electrical condition of the one or more windings of the transformer (e.g. current or voltage). The method also includes receiving, by the one or more control devices, a signal indicative of the at least one electrical condition of the one or more windings of the transformer. As such, the method further includes adjusting, by the one or more control devices, the initial operating limit based at least in part on the at least one electrical condition of the one or more windings of the transformer.

16 Claims, 4 Drawing Sheets

(51) Int. Cl.

| | | |
|---|---|---|
| *F03D 9/25* | (2016.01) | |
| *H02K 7/18* | (2006.01) | |
| *H02H 9/02* | (2006.01) | |
| *G05F 1/10* | (2006.01) | |
| *H02J 3/18* | (2006.01) | |
| *F03D 80/00* | (2016.01) | |
| *F03D 7/02* | (2006.01) | |
| *H02H 3/00* | (2006.01) | |

(52) U.S. Cl.
CPC .............. *F03D 7/028* (2013.01); *F03D 80/00* (2016.05); *H02H 3/006* (2013.01)

(56) References Cited

U.S. PATENT DOCUMENTS

| | | | |
|---|---|---|---|
| 7,834,472 B2 | 11/2010 | Rebsdorf et al. | |
| 8,022,565 B2 * | 9/2011 | Scholte-Wassink | F03D 7/0292 290/44 |
| 8,183,704 B2 | 5/2012 | Rivas et al. | |
| 8,207,623 B2 | 6/2012 | Rivas et al. | |
| 8,264,094 B2 | 9/2012 | Rivas et al. | |
| 8,294,288 B2 | 10/2012 | Rivas et al. | |
| 8,593,114 B2 | 11/2013 | Park et al. | |
| 8,664,788 B1 | 3/2014 | Wagoner et al. | |
| 8,907,510 B2 | 12/2014 | Wagoner et al. | |
| 8,975,768 B2 | 3/2015 | Wagoner et al. | |
| 9,369,076 B2 | 6/2016 | Xu et al. | |
| 2007/0216164 A1 | 9/2007 | Rivas et al. | |
| 2010/0133831 A1 | 6/2010 | Scholte-Wassink et al. | |
| 2011/0031762 A1 * | 2/2011 | Letas | H02J 3/1892 290/55 |
| 2012/0112708 A1 | 5/2012 | Park et al. | |
| 2013/0038061 A1 | 2/2013 | Rivas et al. | |
| 2013/0234435 A1 | 9/2013 | Wagoner et al. | |
| 2014/0070535 A1 | 3/2014 | Wagoner et al. | |
| 2014/0103651 A1 | 4/2014 | Grinblat | |
| 2014/0361538 A1 | 12/2014 | Wagoner et al. | |
| 2015/0159625 A1 | 6/2015 | Hardwicke, Jr. et al. | |
| 2015/0188468 A1 | 7/2015 | Xu et al. | |
| 2015/0252784 A1 | 9/2015 | Seymour et al. | |
| 2015/0372481 A1 | 12/2015 | Roesner et al. | |
| 2016/0118786 A1 | 4/2016 | Zhu et al. | |
| 2016/0128231 A1 | 5/2016 | Wagoner et al. | |
| 2016/0146191 A1 * | 5/2016 | Berroteran Gil | H02P 9/007 290/44 |
| 2016/0341179 A1 | 11/2016 | Klodowski et al. | |
| 2016/0348646 A1 | 12/2016 | Barker et al. | |
| 2017/0250682 A1 * | 8/2017 | Fernandez Robayna | H04B 1/04 |

\* cited by examiner

CONTROL METHOD FOR PROTECTING TRANSFORMERS

FIELD

The present disclosure relates generally to wind turbines, and more particular to control methods for protecting transformers of wind turbines.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades of the wind turbine and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. In certain configurations, the associated electrical power can be transmitted to a turbine transformer that is typically connected to a power grid via a grid breaker. Thus, the turbine transformer steps up the voltage amplitude of the electrical power such that the transformed electrical power may be further transmitted to the power grid.

In many wind turbines, the generator rotor may be electrically coupled to a bi-directional power converter that includes a rotor-side converter joined to a line-side converter via a regulated DC link. More specifically, some wind turbines, such as wind-driven doubly-fed induction generator (DFIG) systems or full power conversion systems, may include a power converter with an AC-DC-AC topology.

For conventional wind turbines, a fixed current limit or rating is specified for the turbine transformer. The fixed current limit is typically determined based on specified and/or tested performance of the wind turbine. As such, a converter controller limits the system current based on primary and secondary currents as compared to the fixed current limit. Currently, the fixed current limit covers minimum turbine voltage on the primary and secondary windings of the turbine transformer. Thus, at certain instances of operation, the turbine transformer is capable of operating at higher voltages, but fails to do so because of the fixed current limit which is set at the design stage of the transformer.

Accordingly, a control methodology for improving and protecting performance of the turbine transformer in the wind turbine would be welcomed in the art.

BRIEF DESCRIPTION

Aspects and advantages of embodiments of the present disclosure will be set forth in part in the following description, or may be learned from the description, or may be learned through practice of the embodiments.

In one aspect, the present disclosure is directed to a method for controlling a transformer. The method includes specifying, in one or more control devices, an initial operating limit (e.g. an initial current limit or an initial temperature limit) for one or more windings of the transformer. Further, the method includes monitoring, via one or more sensors, at least one electrical condition of the one or more windings of the transformer (e.g. current or voltage). The method also includes receiving, by the one or more control devices, a signal indicative of the at least one electrical condition of the one or more windings of the transformer. As such, the method further includes adjusting, by the one or more control devices, the initial operating limit based at least in part on the at least one electrical condition of the one or more windings of the transformer.

In another aspect, the present disclosure is directed to a system for controlling a transformer. The system includes one or more sensors configured to monitor at least one electrical condition of one or more windings of the transformer, the at least one electrical condition comprising at least one of current or voltage and at least one control device communicatively coupled to the sensor(s). The control device(s) is configured to perform one or more operations, including but not limited to specifying an initial current limit for one or more windings of the transformer, receiving a signal indicative of the at least one electrical condition of the one or more windings of the transformer, and adjusting the initial current limit based at least in part on the at least one electrical condition of the one or more windings of the transformer.

In yet another aspect, the present disclosure is directed to a method for controlling a transformer. The method includes monitoring, via one or more sensors, at least one electrical condition of the one or more windings of the transformer. The method also includes receiving, by the one or more control devices, a signal indicative of the at least one electrical condition of the one or more windings of the transformer. Further, the method includes adjusting, by the one or more control devices, an initial current limit using a multiplier based at least in part on the at least one electrical condition of the one or more windings of the transformer.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "about" when used in reference to a multiplier means within 10% of the stated value. As used in the specification and the appended claims, the singular forms "a," "an," and "the" include plural referents unless the context clearly dictates otherwise.

Example aspects of the present disclosure are directed to systems and methods for controlling one or more transformers of a power system. In example embodiments, the transformer(s) can be controlled to make power output (e.g., real and/or reactive power output) adjustments based on varying conditions. As one example, the transformer(s) can make adjustments to an output current in response to a measured voltage condition of one or more of the windings of the transformer. More specifically, as a measured voltage decreases, a current limit can be increased to maintain the same power output. Additionally, as a measured voltage increases, a current level can be decreased to maintain the same power output.

The transformer(s) can be controlled to operate within operating limits, such as current limits and/or temperature limits. However, the operating limits can sometimes prevent the transformer(s) from making appropriate adjustments in response to varying conditions. According to aspects of the present disclosure, a multiplier can be determined based on voltage conditions associated with the transformer. The multiplier can be used to modify one or more operating limits for the transformer. For example, the modified current limit can be the initial current limit multiplied by the multiplier. Based on the comparison of the modified operating limit to the operating condition of the transformer, a control system can control a converter connected to transformer to reduce the current through the transformer, in order to protect the transformer to an increased capability of the transformer.

In this way, the systems and methods according to example aspects of the present disclosure can have a number of technical effects and benefits. For instance, example aspects of the present disclosure have a technical effect of increasing operating ranges of transformers under varying conditions. This can lead to increased energy capture and energy production.

Figure 1:
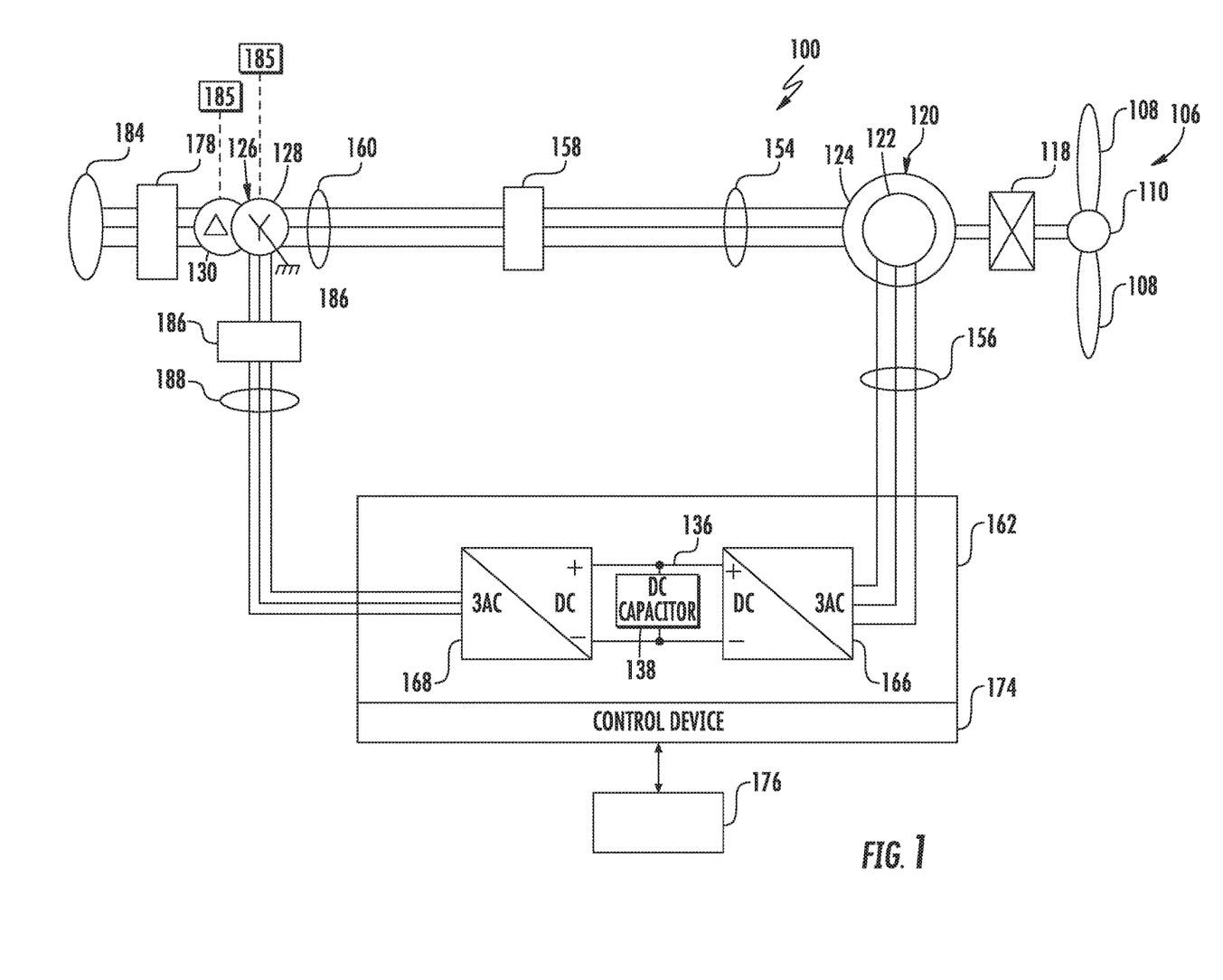
FIG. 1 illustrates a schematic diagram of one embodiment of a DFIG power system according to the present disclosure.

With reference now to the figures, example aspects of the present disclosure will be discussed in greater detail. More specifically, FIG. 1 illustrates a doubly fed induction generator (DFIG) system 120 according to example aspects of the present disclosure, which includes a DFIG 120. The present disclosure will be discussed with reference to the example DFIG system 100 of FIG. 1 for purposes of illustration and discussion. Those of ordinary skill in the art, using the disclosures provided herein, should understand that aspects of the present disclosure are also applicable in other systems, such as full power conversion wind turbine systems, solar power systems, energy storage systems, and other power systems.

In the example DFIG system 100, a rotational component 106 includes a plurality of rotor blades 108 coupled to a rotating hub 110. The rotational component 106 is coupled to an optional gear box 118, which is, in turn, coupled to a generator 120.

Further, as shown, the DFIG 120 includes a rotor 122 and a stator 124. Moreover, as shown, the DFIG 120 is typically coupled to a stator bus 154 and a power converter 162 via a rotor bus 156. The stator bus 154 provides an output multiphase power (e.g. three-phase power) from the stator 124 of the DFIG 120 and the rotor bus 156 provides a multiphase power (e.g. three-phase power) of the rotor 122 of the DFIG 120. Referring to the power converter 162, the DFIG 120 is coupled via the rotor bus 156 to a rotor side converter 166. Further, as shown, the rotor side converter 166 is coupled to a line side converter 168 which in turn is coupled to a line side bus 188. In various embodiments, a transformer 126 can be coupled to line side bus 188 to convert the AC power from the line side bus 188 to a voltage suitable for application to a cluster network or an electrical grid 184. For example, as shown, the transformer 126 is a two-winding transformer having, at least, a primary winding 128 and a second winding 130. In further embodiments, the transformer 126 may be a three-winding transformer.

In example configurations, the rotor side converter 166 and the line side converter 168 are configured for operating using pulse width modulation (PWM) arrangement of IGBT switching devices or other switching devices. Further, as shown, the rotor side converter 166 and the line side converter 168 can be electrically coupled via a DC bus 136 across which is the DC link capacitor 138.

Still referring to FIG. 1, the power converter 162 can be coupled to a control device 174 to control the operation of the rotor side converter 166 and the line side converter 168. It should be noted that the control device 174, in typical embodiments, is configured as an interface between the power converter 162 and a control system 176 of the power system 100.

In some configurations, various circuit breakers including, for example, cluster breaker or grid breaker 182, rotor bus breaker 158, grid breaker 178, and/or line bus breaker 186 can be included for isolating various components as necessary for normal operation of the DFIG 120 during connection to and disconnection from the cluster network and/or the electrical grid 184. More specifically, as shown, the line bus breaker 186 can couple the line side bus 188 to the transformer 126, which is coupled to the cluster network or the electrical grid 184 via the cluster breaker or grid breaker 182.

In operation, power generated by the DFIG 120 by rotating the rotational component 106 is provided via a dual path to the cluster network or the electrical grid 184. The dual paths are defined by the stator bus 154 and the rotor bus 156. On the rotor bus side 156, sinusoidal multi-phase (e.g. three-phase) AC power is provided to the power converter 162. The rotor side power converter 166 converts the AC power provided from the rotor bus 156 into direct current ("DC") power and provides the DC power to the DC bus 136. Switching devices (e.g. IGBTs) used in parallel bridge circuits of the rotor side power converter 166 can be modulated to convert the AC power provided from the rotor bus 156 into DC power suitable for the DC bus 136.

The line side converter 168 converts the DC power on the DC bus 136 into AC power, which is provided to the line side bus 188. In particular, switching devices (e.g. IGBTs, MOSFETs, etc.) used in bridge circuits of the line side power converter 168 can be modulated to convert the DC power on the DC bus 136 into AC power on the line side bus 188. The transformer can convert the AC power at a first voltage from the line side bus 188 to AC power at a second voltage, such as the voltage of power on the stator bus 154. The AC power from the power converter 162 can be combined with the power from the stator of the DFIG 120 to provide multi-phase power (e.g. three-phase power) having a frequency maintained substantially at the frequency of the cluster network or the electrical grid 184 (e.g. 50 Hz/60 Hz).

The power converter 162 can receive control signals from, for instance, the control system 176 via the control device 174. The control signals can be based, among other things, on sensed conditions or operating characteristics of the power system 100. Typically, the control signals provide for control of the operation of the power converter 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the control device 174 to control the power system 100, including, for example, transformer electrical condition sensors 183, 185 as well as stator and rotor bus voltages and current feedbacks. Using the various forms of feedback information, switching control signals (e.g. gate timing commands for IGBTs), stator synchronizing control signals, and circuit breaker signals can be generated.

Figure 2:
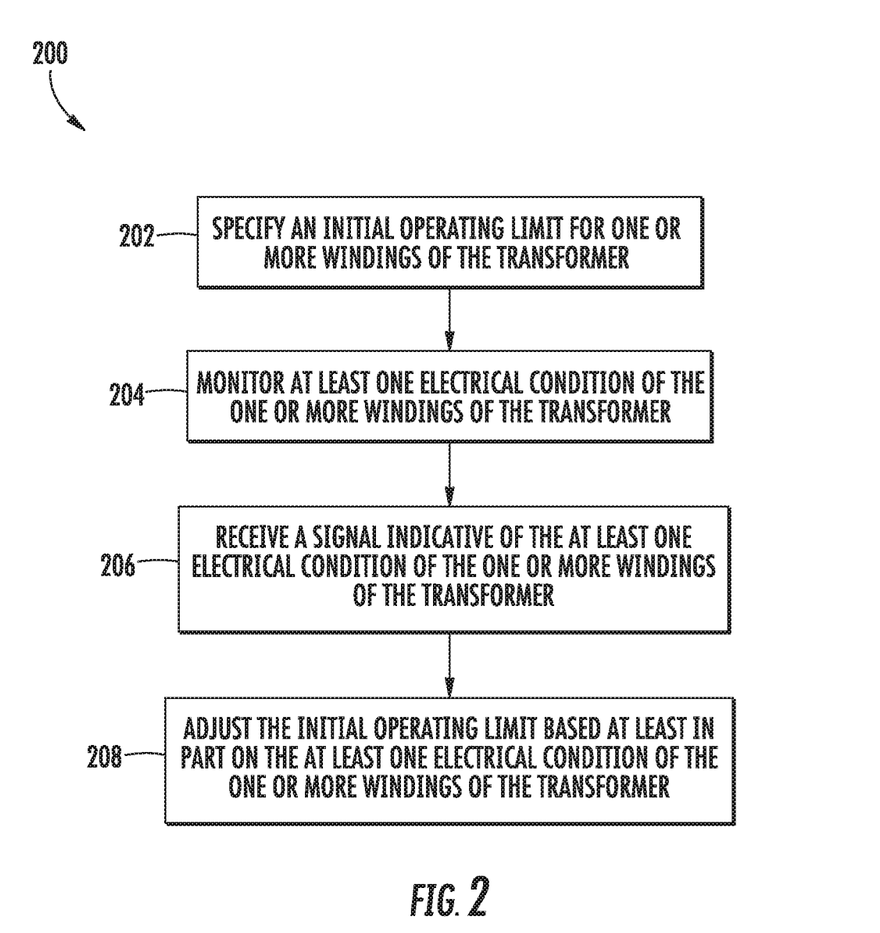
FIG. 2 illustrates a flow diagram of one embodiment of a method for controlling a transformer according to the present disclosure.

Referring now to FIG. 2, an example control method 200 for protecting a transformer according to example aspects of the present disclosure is illustrated. As shown at 202, the method 200 includes specifying, in the control device 174, an initial operating limit (e.g. an initial current limit or an initial temperature limit) for one or more windings of the transformer 126. For example, in one embodiment, the initial current limit may be specified at one volt per unit (Vpu) on each winding 128, 130. As shown at 204, the method 200 includes monitoring, via one or more sensors 183, 185, at least one electrical condition of the winding(s) 128, 130 of the transformer 126. For example, in certain embodiments, the electrical condition(s) of the winding(s) 128, 130 of the transformer 126 may include current, voltage, or any other parameter of the winding(s) 128, 130 of the transformer 126. As such, as shown at 206, the method 200 includes receiving, by the control device 174, a signal indicative of the electrical condition(s) of the one or more windings 128, 130 of the transformer 126.

As shown at 208, the method 200 includes adjusting, by the control device 174, the initial operating limit based at least in part on the electrical condition(s) of the winding(s) 128, 130. For example, in one embodiment, the control device 174 may increase the initial operating limit based on voltage of the winding(s) 128, 130. More specifically, in certain embodiments, the control device 174 may linearly increase the initial operating limit by a specified gain if the voltage drops below a predetermined threshold. In one embodiment, the specified gain may be approximately equal to or greater than one. Thus, in one example, as the voltage drops below the threshold (e.g. 1 Vpu), the control device(s) 174 may be configured to allow the current limit to increase linearly with a gain of one. Alternatively, the control device 174 may increase the initial operating limit based on a specified polynomial function if the voltage drops below a predetermined threshold. Further, the control device(s) 174 are configured to cap such a relationship at certain winding voltages (e.g. at 0.95 Vpu or 0.9 Vpu) such that the operating limits are not exceeded. In additional embodiments, the control device(s) 174 may also be configured to vary the specified gain based on the electrical condition(s).

For example, in one embodiment, the control device(s) 174 may determine a multiplier based at least in part on the electrical condition(s) of the winding(s) 128, 130 of the transformer 126 and multiply the initial operating limit by the multiplier. In such embodiments, the multiplier may have a value greater than or equal to one. In further embodiments, the multiplier may also have a value less than about 1.05 (e.g. such as 1, 1.03, 1.05, etc.).

In several embodiments, the method 200 may further include determining a range of the electrical condition(s) and limiting the multiplier when the at least one electrical condition operates outside of the range. For example, in one embodiment, the initial current limit may be multiplied by 1.05 when the winding voltage is 0.95 Vpu. Similarly, the initial current limit may be multiplied by one when the winding voltage is Vpu. Outside of this range, however, the control device(s) 174 may limit or clamp the multipliers to 1 and 1.05. In other embodiments, for example, when the winding voltage is 0.97 Vpu, the initial current limit may be multiplied by 1.03.

Figure 3:
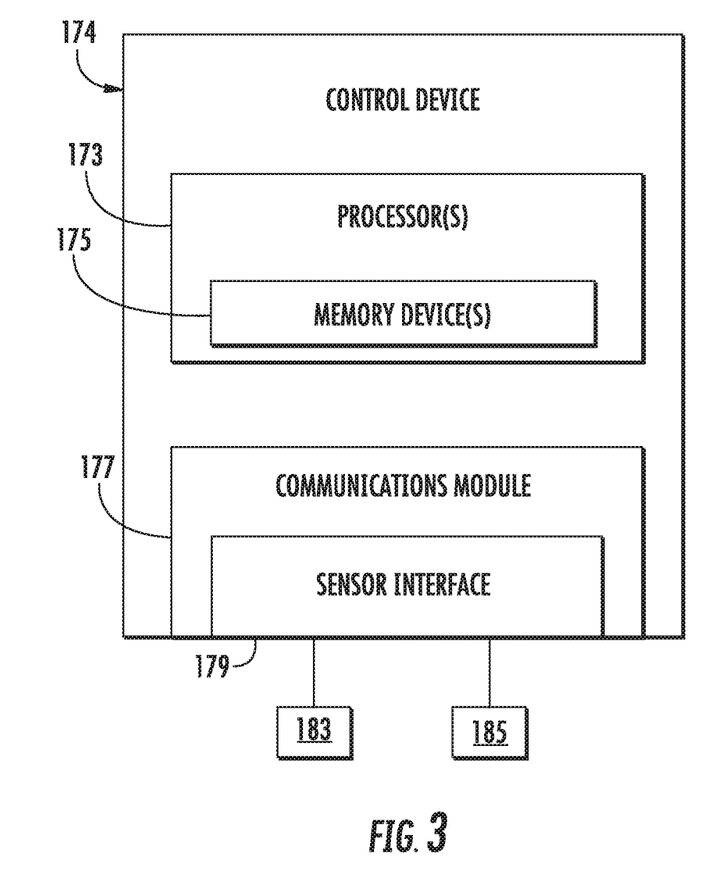
FIG. 3 illustrates a block diagram of suitable components that may be included in a control device according to the present disclosure.

Referring now to FIG. 3, an example control device 174 according to example embodiments of the present disclosure is illustrated. As shown, the control device 174 can be, for example, a control device associated with an DFIG wind turbine system, a wind farm (e.g., a cluster-level or farm-level control device) and/or can include one or more control devices associated with aspects of a wind turbine system, such as one or more control devices associated with a power conversion system 162. In some embodiments, the control device(s) 174 can include one or more processor(s) 173 and one or more memory device(s) 175. The processor(s) 173 and memory device(s) 175 can be distributed so that they are located at one more locales or with different devices.

The processor(s) 173 and memory device(s) 175 can be configured to perform a variety of computer-implemented functions and/or instructions (e.g., performing the methods, steps, calculations and the like and storing relevant data as disclosed herein). The instructions when executed by the processor(s) 173 can cause the processor(s) 173 to perform operations according to example aspects of the present disclosure. For instance, the instructions when executed by the processor(s) 173 can cause the processor(s) 173 to implement the methods of FIG. 2 discussed herein.

Additionally, the control device(s) 174 can include a communication module 177 to facilitate communications between the control device 174 and various components of a wind turbine system, wind farm, or power system, including power demand parameters or power generation set points as described herein. Further, the communication module 177 can include a sensor interface 179 (e.g., one or more analog-to-digital converters) to permit signals transmitted from one or more sensors 183, 185 to be converted into signals that can be understood and processed by the processor(s) 173. It should be appreciated that the sensors (e.g. sensors 183, 185) can be communicatively coupled to the sensor interface 179 using any suitable means, such as a wired or wireless connection. The signals can be communicated using any suitable communications protocol. The sensors 183, 185 can be, for example, voltage sensors, current sensors, power sensors, temperature sensors, or any other sensor device described herein. As such, the processor(s) 173 can be configured to receive one or more signals from the sensor(s) 183, 185.

As used herein, the term "processor" refers not only to integrated circuits referred to in the art as being included in a computer, but also refers to a control device, a microcontrol device, a microcomputer, a programmable logic control device (PLC), an application specific integrated circuit, and other programmable circuits. Additionally, the memory device(s) 175 can generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 175 can generally be configured to store suitable computer-readable instructions that, when implemented by the processor(s) 173, configure the control device 174 to perform the various functions as described herein.

Figure 4:
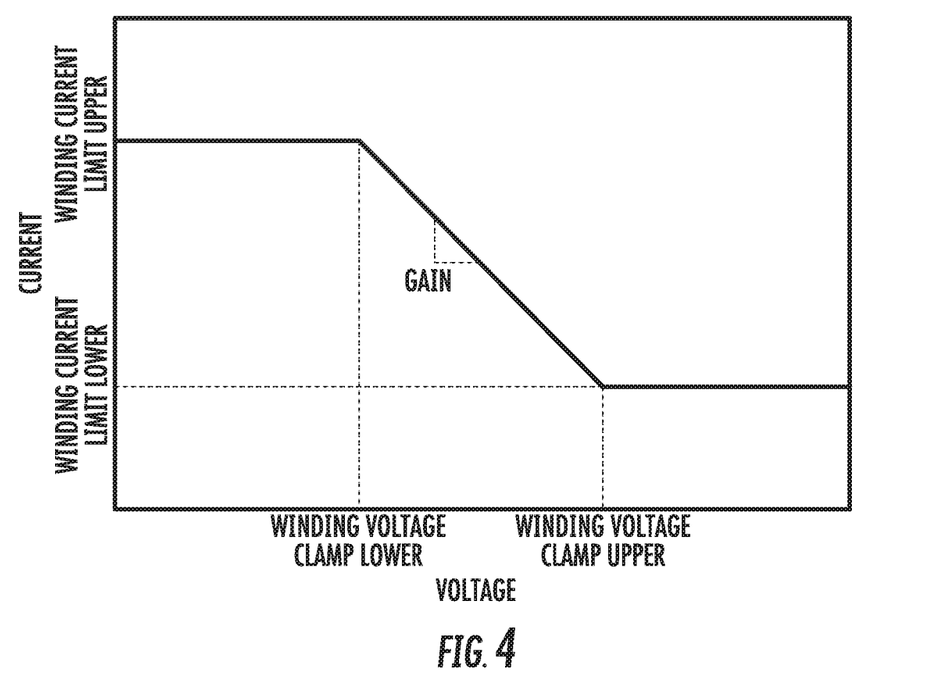
FIG. 4 illustrates a graph of the transformer winding current limit calculation based on the winding voltage according to the present disclosure.

Referring now to FIG. 4, a graph of the transformer winding current limit based on the winding voltage according to the present disclosure is illustrated. More specifically, as shown, the control device(s) 174 is configured to use a linear (or polynomial) calculation between winding voltage and current limit. Further, the control device(s) 174 may use measured voltages on each winding to calculate the current limits. Moreover, as shown, the specified gain can be selected by setting upper and lower winding current limits as well as upper and lower winding voltage clamp limits and selecting the gain from within the set limits based on a linear function. In further embodiments, the control device(s) 174 may also consider the impedance of the transformer 126, as well as the real and reactive power in the system to calculate the various winding voltages based on this feedback. The current limits and a top of charge (TOC) threshold could be calculated with this technique.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a transformer having a plurality of transformer windings, the method comprising:
   specifying, in one or more control devices, an initial current limit for each of the plurality of transformer windings of the transformer;
   monitoring, via one or more sensors, at least one electrical condition of each of the plurality of transformer windings of the transformer;
   receiving, by the one or more control devices, a signal indicative of the at least one electrical condition of each of the plurality of transformer windings of the transformer;
   increasing or decreasing, by the one or more control devices, the initial current limit of each of the plurality of transformer windings of the transformer to an updated current limit by a specified gain if the at least one electrical condition drops below a predetermined threshold; and
   varying the specified gain based on the at least one electrical condition by setting upper and lower transformer winding current limits and upper and lower transformer winding voltage clamp limits and selecting the specified gain from within the set limits based on a linear or polynomial function.

2. The method of claim 1, wherein the at least one electrical condition comprises voltage or current.

3. The method of claim 1, wherein increasing or decreasing the initial current limit based at least in part on the at least one electrical condition of each of the plurality of transformer windings of the transformer further comprises increasing the initial current limit based at least in part on the at least one electrical condition of each of the plurality of transformer windings of the transformer.

4. The method of claim 3, wherein increasing the initial current limit based at least in part on the at least one electrical condition of each of the plurality of transformer windings of the transformer further comprises linearly increasing the current limit by the specified gain if the at least one electrical condition drops below the predetermined threshold.

5. The method of claim 4, wherein the specified gain has a value greater than or equal to one.

6. The method of claim 3, wherein increasing the initial current limit based at least in part on the at least one electrical condition of each of the plurality of transformer windings of the transformer further comprises:
   determining a multiplier based at least in part on the at least one electrical condition of each of the plurality of transformer windings of the transformer; and
   multiplying the initial operating limit by the multiplier.

7. The method of claim 6, wherein the multiplier has a value greater than or equal to one.

8. The method of claim 7, wherein the multiplier has a value less than about 1.05.

9. The method of claim 6, further comprising determining a range of the at least one electrical condition and limiting the multiplier when the at least one electrical condition operates outside of the range.

10. A system for controlling a transformer having a plurality of transformer windings, the system comprising:
    one or more sensors configured to monitor at least one electrical condition of each of the plurality of windings of the transformer, the at least one electrical condition comprising at least one of current or voltage; and, at least one control device communicatively coupled to the one or more sensors, the at least one control device configured to perform one or more operations, the one or more operations comprising:

specifying an initial current limit for each of the plurality of transformer windings of the transformer;

receiving a signal indicative of the at least one electrical condition of each of the plurality of transformer windings of the transformer; and, increasing or decreasing the initial current limit of each of the plurality of transformer windings of the transformer to an updated current limit by a specified gain if the at least one electrical condition drops below a predetermined threshold; and varying the specified gain based on the at least one electrical condition by setting upper and lower transformer winding current limits and upper and lower transformer winding voltage clamp limits and selecting the specified gain from within the set limits based on a linear or polynomial function.

11. The system of claim 10, wherein increasing or decreasing the initial current limit based at least in part on the at least one electrical condition of each of the plurality of transformer windings of the transformer further comprises increasing the initial current limit based at least in part on the at least one electrical condition of each of the plurality of transformer windings of the transformer.

12. The system of claim 11, wherein increasing the initial current limit based at least in part on the at least one electrical condition of each of the plurality of transformer windings of the transformer further comprises linearly increasing the initial current limit by a specified gain if the at least one electrical condition drops below a predetermined threshold.

13. The system of claim 12, wherein the specified gain has a value greater than or equal to one.

14. The system of claim 11, wherein increasing the initial current limit based at least in part on the at least one electrical condition of each of the plurality of transformer windings of the transformer further comprises:

determining a multiplier based at least in part on the at least one electrical condition of each of the plurality of transformer windings of the transformer; and multiplying the initial current limit by the multiplier.

15. The system of claim 14, wherein the multiplier has a value greater than or equal to one and less than about 1.05.

16. The system of claim 10, wherein the one or more operations further comprise determining a range of the at least one electrical condition and limiting the multiplier when the at least one electrical condition operates outside of the range.

* * * * *